F. GROHAL.
NON-SKID TIRE ARMOR.
APPLICATION FILED FEB. 18, 1915.
1,139,274.
Patented May 11, 1915.
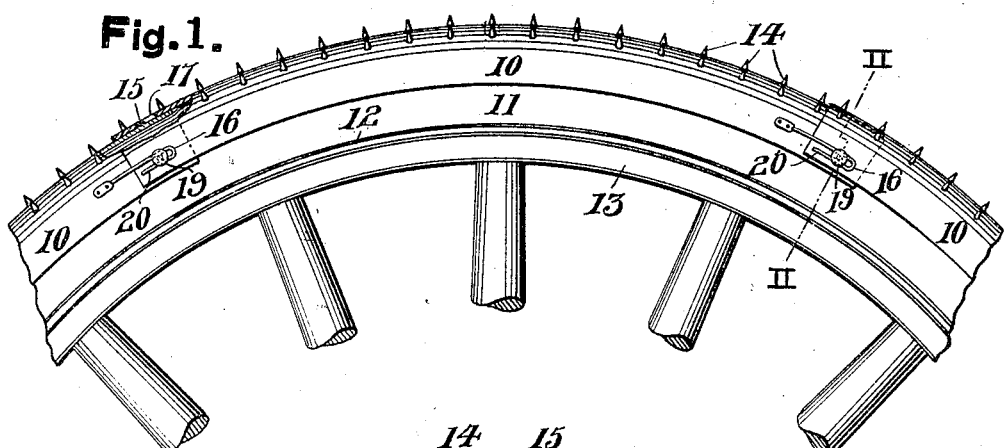
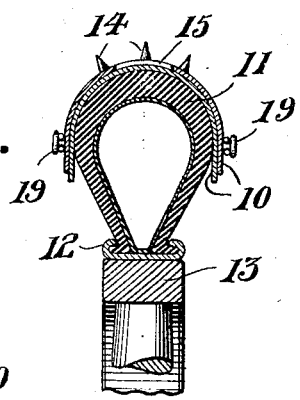
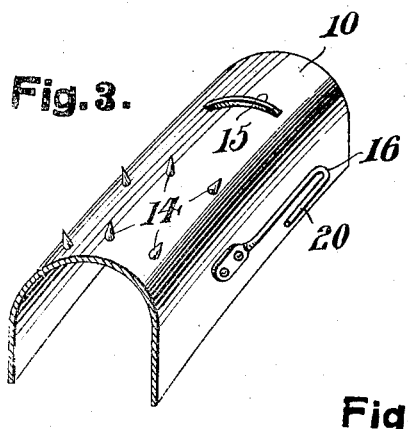
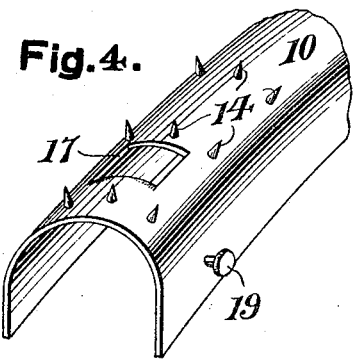
Witnesses
T. Z. Toroziewicz.
T. K. Bryant.
Inventor
F. Grohal
By A. M. Wilson
Attorney

UNITED STATES PATENT OFFICE.

FRANK GROHAL, OF GREENSBURG, PENNSYLVANIA.

NON-SKID TIRE-ARMOR.

1,139,274. Specification of Letters Patent. Patented May 11, 1915.

Application filed February 18, 1915. Serial No. 9,077.

*To all whom it may concern:*

Be it known that I, FRANK GROHAL, subject of the Emperor of Austria-Hungary, residing at Greensburg, in the county of Westmoreland and State of Pennsylvania, have invented certain new and useful Improvements in Non-Skid Tire-Armor, of which the following is a specification.

This invention relates to certain new and useful improvements in non-skid tire armor.

The primary object of this invention is to provide a sectional armor adapted for ready application to the tread portion of a tire and furnishing protection therefor as well as supplying a calked surface for preventing skidding and side slipping of the wheel and thereby affording additional traction properties.

A further object of the invention is the provision of a tire armor comprising exteriorly calked sections adapted for overlapping engagement circumferentially of the tread portion of a tire and being easily attached and removed therefrom, the inflation of the tire automatically locking the armor thereon.

With these general objects in view and others that will appear as the nature of the invention is better understood, the same consists in the novel combination and arrangement of parts hereinafter more fully described, illustrated in the accompanying drawings, and pointed out in the appended claims.

In the drawings forming a part of this application and in which like-designating characters refer to corresponding parts throughout the several views, Figure 1 is a side elevation of a portion of a wheel provided with the present device and partially broken away. Fig. 2 is a transverse sectional view taken upon line II—II of Fig. 1. Fig. 3 is a transverse view of one of the underlying end portions of an armor section. Fig. 4 is a similar perspective view of an overlying end portion of one of the sections, and Fig. 5 is a detail longitudinal sectional view showing the interengaging rib and slot locking means for the sections.

Referring more in detail to the drawings, the present device consists particularly of a plurality of elongated metallic armor sections 10 adapted for overlapping end engagement arranged circumferentially of the tread portion of the tire such as 11, the said tire being mounted upon a rim 12 of the wheel 13. Each armor section 10 is substantially semicircular or U-shaped in cross section and is provided with outwardly projecting pointed calks 14. Each of the sections 10 has one end thereof provided with a projecting transversely arranged locking rib 15, and opposite longitudinally arranged side hooks 16, while the other end of each section has a central longitudinal slot 17 in the tread portion thereof, the rear edge 18 of which slot is inclined, while outwardly projecting pins 19 are arranged at opposite sides of the slot 17.

By referring more especially to Fig. 1, it will be seen that the sections 10 are arranged upon the tire 11 when the same is partially deflated, and that the rib ends of each section underlies the slotted end of the adjacent section, the rib 15 projecting through the receiving slot 17. The hooks 16 are formed of flexible material so that by exerting outward pressure upon the free end portions 20 of the hooks, the hooks may be readily engaged with the heads of the pins 19. With the sections so arranged, the tire 11 is inflated which shifts the armor sections in an expanding direction and seats the rib 15 of each underlying end in engagement with the outer end face 18 of its receiving slot 17 and whereby all of the sections are firmly locked together upon the tire. Through this locking movement of the armor sections, the hooks 16 remain engaged with the pins 19 and the pins are thereby drawn toward the closed ends of the said hooks.

It will thus be seen that a plurality of the armor sections may be readily positioned entirely inclosing the tread portion of the tire and the same will be automatically locked thereon upon completely inflating the tire, while the hooks 16 will retain the sections until such complete inflation of the tire and automatic locking of the sections thereof is effected. The calks 14 will thus be positioned upon the tread portion of the wheel for engaging the road bed during the travel of the wheel thereover, and obviously, the armor may be readily removed from the wheel whenever the tire is deflated.

While the form of the invention herein shown and described is what is believed to be the preferred embodiment thereof, it is nevertheless to be understood that minor changes may be made therein without departing from the spirit and scope of the invention as claimed.

What I claim as new is:—

1. A tire armor comprising a plurality of U-shaped sections each having a centrally positioned elongated slot adjacent one end thereof and provided with an upwardly directed inclined rear wall, a transversely arranged angularly projecting rib carried on the tread portion on the other end of each of said sections, said rib adapted to be received in the adjacent slot and engaging the inclined wall to prevent outward movement of the overlapped section, and side connecting means between the adjacent ends of the said sections.

2. A tire armor including sections arranged in overlapped relation upon the tread portion of the tire, each section having a transverse and angularly projecting rib adjacent one end thereof, the opposite end of each section being provided with a slot in its tread portion with the rib of the adjacent section slidably positioned therein, the rear walls of the said slots being inclined to prevent outward movement of the overlapped section, oppositely projecting pins carried by the overlapping section ends and retaining hooks carried by the underlying section ends engaging the said pins.

In testimony whereof I affix my signature in presence of two witnesses.

FRANK GROHAL.

Witnesses:
MARTIN KOSLOWSKI,
FRANK E. GRAHAM.